Nov. 23, 1965 R. G. CAIRNS 3,218,881
ACCELERATOR THROTTLE CONTROL
Filed July 7, 1961
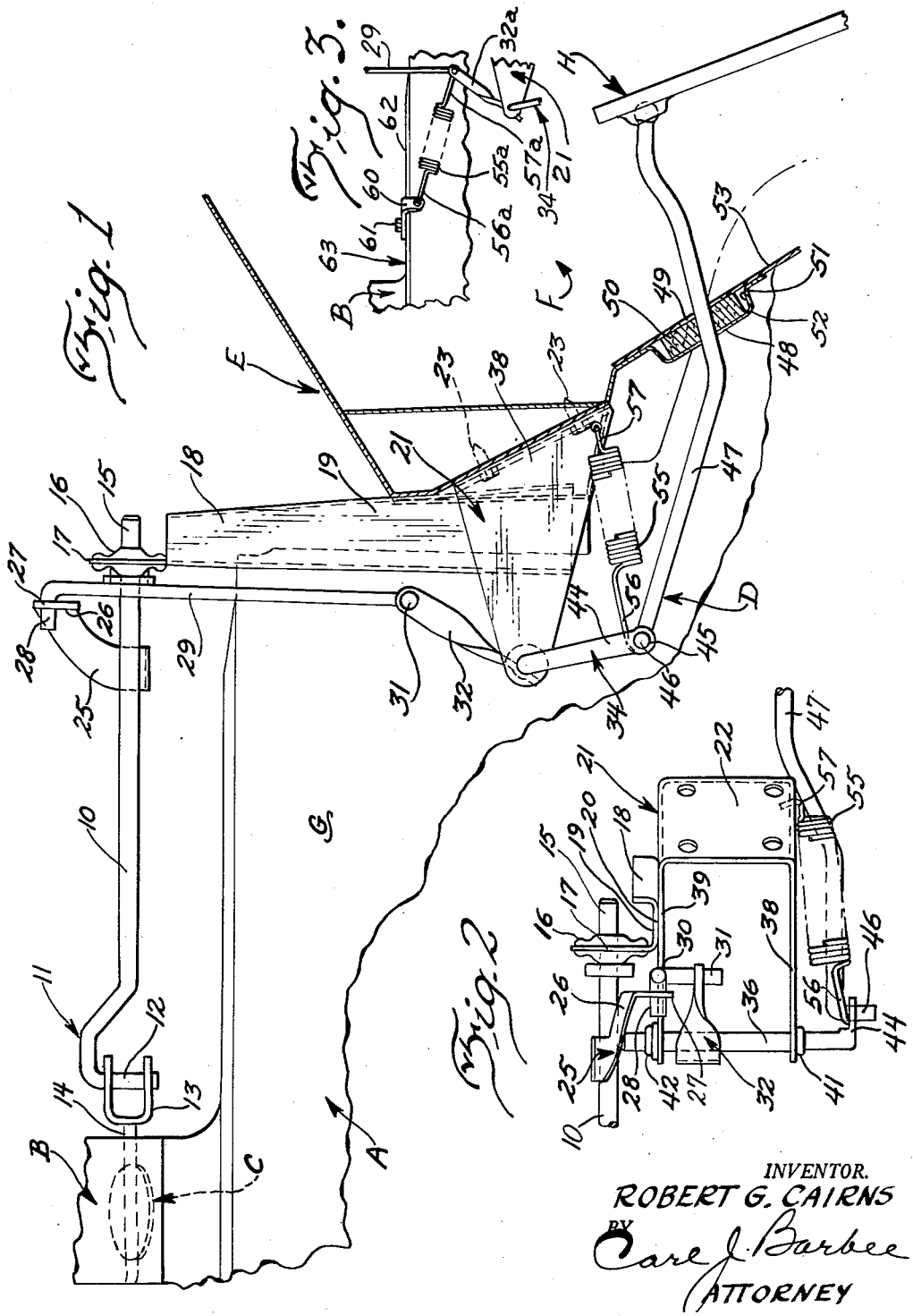
INVENTOR.
ROBERT G. CAIRNS
BY
Carl J. Barbee
ATTORNEY United States Patent Office 3,218,881
Patented Nov. 23, 1965

3,218,881
ACCELERATOR THROTTLE CONTROL
Robert G. Cairns, Racine, Wis., assignor to American Motors Corporation, Kenosha, Wis., a corporation of Maryland
Filed July 7, 1961, Ser. No. 122,492
5 Claims. (Cl. 74—513)

The invention relates to a throttle valve actuating mechanism for an automotive vehicle. The invention has particular reference to the linkage assembly interconnecting the valve actuating accelerator shaft with a remotely situated foot pedal.

The principal object of the invention is to provide a linkage assembly in which the accelerator shaft actuating link is subjected to a minimum of lateral movement throughout its up and down operating range.

Another object is to provide novel suporting structure in association with the linkage assembly.

Other objects and advantages of the invention will be apparent from the ensuing specification and appended drawing in which:

FIG. 1 is a side elevational view of a portion of an automotive vehicle showing the throttle valve actuating mechanism and its relationship with the engine.

FIG. 2 is a plan view of a portion of the mechanism shown in FIG. 1 with certain parts removed (such as the showing of the engine and of the dash panel which separates the engine compartment of the vehicle from the passenger compartment).

FIG. 3 is a fragmentary view on a reduced scale similar to FIG. 1 and showing a modified form of spring mechanism.

Referring to FIG. 1, I have shown a portion of an engine A and a portion of the carburetor B having a conventional throttle valve C. The valve actuating apparatus, which is identified generally by the letter D, is anchored to the vehicle dash panel E which separates the passenger compartment F from the engine compartment G of the vehicle. A foot pedal H may be hingedly mounted on the floor portion of the vehicle for initiating the ultimate rotative motion of the accelerator shaft 10. The hinged mounting of the foot pedal and the floor of the vehicle are not shown.

One end of the accelerator shaft is generally bent in the manner as shown in FIG. 1 in the area at 11 so that the radially extending end 12 is received in suitable openings (not shown) in the U-shaped bracket 13 to which the valve shaft 14 is anchored. The other end 15 of the accelerator shaft is rotatably carried in a bearing assembly 16 which is anchored to the upwardly projecting ear portion 17 of bracket 18.

Bracket 18 has its side wall 19 anchored to the side face 20 of bracket 21. Bracket 21 may be in the form of a U-shaped stamping having its web portion 22 anchored to the dash panel, as by means of bolts 23. The bracket 18 may be channel shaped in cross section for purposes of rigidity. Anchored to the accelerator shaft 10, as by welding, is a bracket 25 which is bent at 26 to provide the laterally offset flange 27 to which the bent upper end 28 of link 29 is pivotally mounted. The lower end of link 29 is bent at 30 to provide a laterally extending end portion 31 to which the outer end of the crank arm 32 is pivotally mounted.

A crank, identified generally by the numeral 34, has the transverse shaft portion 36 which extends between and is rotatably carried by the spaced side walls 38 and 39 of bracket 21. Suitable retainer members 41 and 42 limit the longitudinal play of the crank shaft relative to the supporting U bracket.

The crank arm 32 is anchored, as by welding, to the crank shaft. The downwardly depending crank arm 44 has an opening 45 at its lower end to pivotally receive the bent end 46 of actuating rod 47. Rod 47 projects through suitable openings 48 and 49 in the toe-board portion of the dash panel. A flexible pad 50 of conventional design surrounds the actuating rod and is loosely received within the pocket 51 provided between the stamping 52 and the toe-board 53. A tension spring 55 has one end 56 secured to the actuating rod end and its other end 57 anchored to the side wall 38 of the U bracket.

*Operation*

In the operation of effecting rotation of the accelerator shaft 10, the foot pedal H is depressed toward the toeboard. The actuating rod 47 in moving generally rectilinearly swings the crank arm 44 clockwise, viewing FIG. 1, against the resistance of return spring 55. Crank arm 32 is likewise swung clockwise about the axis of crank shaft 36 exerting a downward pull on link 29. Link 29 likewise exerts a downward pull on bracket 25 effecting the necessary rotation of accelerator shaft 10 for opening throttle valve C. By utilizing a crank as carried by the U bracket, the downward pull on link 29 is maintained in a substantially vertical direction with only a slight amount of lateral movement of said link during the swinging movement of the crank arm 32. Thus, the tendency of any binding condition within the overall linkage assembly is lessened and the ultimate actuation of the accelerator shaft is improved.

The range of rotation of shaft 10 between fully opened and fully closed throttle positions covers an arc of about 80 degrees, such arc being adequately handled by the linkage assembly. Viewing FIG. 1, it will be noted that with the throttle valve in closed position, the link 29 is inclined slightly forwardly from the vertical and the range of lateral movement of the link 29 between fully opened and fully closed position is such that the link never strays far from a normal vertical position.

In the modified form of the invention as shown in FIG. 3, the return spring 55a performs the same function as spring 55 as shown in FIGS. 1 and 2. That is, when the accelerator pedal H is manually depressed for opening the throttle valve, the spring 55a automatically returns the throttle valve to closed position and the accelerator pedal to its respective elevated position. One end 56a of the spring is secured to a bracket 60 which is anchored by bolt 61 to the upper face 62 of the engine head 63. The other end 57a is secured at the upper end of the crank arm 32a.

What is claimed as new is:

1. For use with an automobile having an engine compartment, a passenger compartment, a panel separating said compartments and a carburetor with a throttle valve incorporated therein, apparatus for controlling operation of the throttle valve comprising: an accelerator shaft having one end connected to the throttle valve and extending rearwardly from the throttle valve in a generally horizontal plane toward the panel; a bearing for rotatively supporting the other end of the accelerator shaft; a bracket secured to the panel and projecting outwardly into the engine compartment; a crank having one leg rotatively carried by the bracket about an axis transverse to the axis of the accelerator shaft and in a generally horizontal plane and another leg extending laterally and downwardly from the rotatively supported leg; a rod having one end pivotally connected to the laterally and downwardly extending leg of the crank and its other end projecting into the passenger compartment; means for actuating the rod in a generally rectilinear direction for effecting rotation of the horizontal leg of the crank; said accelerator shaft having a laterally projecting arm secured thereto; said rotatively supported crank leg having a laterally projecting arm secured thereto; a link lying in a substantially vertical position throughout its length and pivotally connected at each of its ends respectively to the laterally projecting arms on the accelerator shaft and rotatively supported crank leg, whereby rotation of the accelerator shaft is effected by substantially rectilinear actuation of the link.

2. For use with an automobile having an engine compartment, a passenger compartment, a panel separating said compartments and a carburetor with a throttle valve incorporated therein, apparatus for controlling operation of the throttle valve comprising: an accelerator shaft having one end connected to the throttle valve; a bearing for rotatively supporting the other end of the accelerator shaft; a U-shaped bracket having its base anchored to the panel and its spaced side walls projecting into the engine compartment and lying in substantially vertical planes; a crank having one leg extending between the bracket side walls and being rotatively carried thereby about an axis transverse to the axis of the accelerator shaft and in a generally horizontal plane; said crank projecting exteriorly of one bracket side wall and forming a second leg extending laterally from the rotatively supported leg; a rod having one end pivotally connected to the laterally extending leg of the crank and its other end projecting into the passenger compartment; means for actuating the rod in a generally rectilinear direction for effecting rotation of the horizontal leg of the crank; said accelerator shaft having a laterally projecting arm secured thereto; said rotatively supported crank leg having a laterally projecting arm secured thereto; a link lying in a substantially vertical position throughout its length pivotally connected at each of its ends respectively to the laterally projecting arms on the accelerator shaft and rotatively supported crank leg, whereby rotation of the accelerator shaft is effected by substantially rectilinear actuation of the link.

3. Apparatus as set forth claim 2 wherein the link has its upper end bent in a direction substantially parallel to the axis of the accelerator shaft and its lower end bent in a direction substantially parallel to the axis of the crank leg which extends between the bracket walls.

4. Apparatus as set forth in claim 3 wherein the bent upper and lower ends of the link lie in a substantially horizontal plane.

5. Apparatus as set forth in claim 3 wherein a second bracket is anchored to one side wall of the U-shaped bracket and extends upwardly therefrom, said accelerator shaft bearing being carried by the second bracket.

References Cited by the Examiner
UNITED STATES PATENTS 2,332,122  10/1943  Vaughn _____ 74—513 X
2,836,076   5/1958  Koehler et al. _____ 74—513 X

FOREIGN PATENTS 764,445  12/1956  Great Britain.

A. HARRY LEVY, *Primary Examiner.*